Patented Mar. 31, 1942

2,277,705

UNITED STATES PATENT OFFICE 2,277,705

REFRACTORY COMPOSITION AND METHOD OF MAKING THE SAME

Charles J. Kinzie and Eugene Wainer, Niagara Falls, N. Y., assignors to The Titanium Alloy Manufacturing Company, New York, N. Y., a corporation of Maine No Drawing. Application January 25, 1940, Serial No. 315,595

18 Claims. (Cl. 106—57)

This invention relates to zircon refractory compositions and the method of making such compositions. More particularly, it relates to such compositions which are fluid and moldable by slip casting or slop molding procedures.

Zircon has found extensive use as a refractory material, and has many excellent characteristics which admirably suit it for such uses. In its application to materials which require resistance to abrasion and corrosion by glasses, slags and fluid melts, generally, however, certain difficulties have been experienced. For such uses, a tough, dense and tight surface is required, usually in a wide variety of intricate shapes. An ideal method of preparing such materials is to form in molds of the required shape, and then fire at a high temperature. In order to secure proper and expeditious filling of the mold and high density and good coherency, strength, toughness and tightness of surface in the fired refractory, the refractory material is mixed with a liquid, such as water, to form a "slip." If sufficient water is used under the proper conditions, the slip is simply cast into the mold by pouring. In the case of slop molding, the pouring of the higher density mixtures (lower water content) into the mold is aided by vibration. The greater the viscosity of the slip, the more difficulty will be encountered in pouring and filling. On the other hand, the use of extremely large quantities of water to secure fluidity is undesirable, because the removal of such water in the firing step will cause the mass to shrink excessively and crack. A condition is therefore desired where the maximum fluidity (lowest viscosity) is obtained with the minimum amount of water. The securing of this condition is known as "deflocculation."

In the case of zircon, it has been observed that if more than 17 cc. of water is required per 100 grams of refractory material, the fired refractory tends to crack in the mold. Difficulty has always been experienced in securing proper deflocculation and fluidity of the slip under these conditions, particularly since ware with the desired finished properties must be formed of finely milled (i. e., minus 325 mesh) material to obtain the dense, tight surface required and should have a zircon content of at least 96% and preferably up to 99 to 100% content. From time to time a number of artifices have been suggested, which are subject to several difficulties. First, they have been found to work with zircon from one original source and prepared in a particular manner, but are inoperative with zircons of other origins or prepared in a different manner. Secondly, such artifices as have been proposed are subject to "afterset", that is, within a short time after preparation the viscosity of the slip increases and the characteristics of a well deflocculated slip start to disappear. Another difficulty attendant on the use of zircon is the extreme density of the mineral and the necessity of working with very high gravity slips. Such dispersions of heavy material have an annoying tendency to settle out, with the result that the bottom portions of the fired refractory are much denser than the upper portions.

It is therefore an object of this invention to manufacture zircon refractory ware from fluid moldable masses. It is another object, in the manufacture of such ware, to secure a proper degree of deflocculation without the use of excess quantities of liquid. Other objects will appear hereinafter.

It has now been found that the difficulties encountered in securing proper deflocculation of zircon can be overcome by keeping the slip substantially free of water soluble and slightly water soluble calcium salts and, to a lesser extent, water soluble and slightly water soluble aluminum salts. Since zircon comminuted to minus 325 mesh is universally milled wet, and since almost all potable inland waters contain lime salts and sometimes aluminum salts in suspension or solution, and since zircon deposits themselves quite often carry lime derivatives in the original ore, lime derivatives may be said to be a general concomitant of finely divided zircon, though the quantity may be minute. Among the harmful materials present in zircon or tap water or otherwise present in the slip may be calcium carbonate, calcium silicate, calcium chloride, calcium hydrate, soda lime, etc.

As a practical matter, it is not feasible to use pure raw materials (water, zircon, etc.) free from calcium and aluminum salts. Accordingly, it has been found that the formation of insoluble crystalline precipitates of these salts effectively eliminates their deleterious characteristics. By adding to the slip, or to the zircon, or to the tap water used in preparing the slip or milling the zircon, an agent which will combine with the calcium and aluminum salts present to form an insoluble crystalline precipitate, the difficulties attendant on the presence of such salts are removed. It is of course well recognized that the terms "insoluble" and "insolubility" are relative. No salt is absolutely insoluble. Even such a highly insoluble salt as mercuric sulfide has a solubility of the order of 1 part in 100,000,000. For the purposes of the present invention, the degree of solubility of the "insoluble" crystalline precipitate is critical. Any material which is more soluble than 0.01 gram per 100 cc. of water, or 1 part in 10,000, is not sufficiently insoluble for the present purposes. For this reason, such materials as calcium carbonate in the presence of $CO_2$, calcium sulfate, calcium silicate in acid or alkaline media, and calcium hydroxide, although often thought of as relatively insoluble, are not operative, and agents which form them are not operative. For the purposes of the present invention, therefore, it has been found that the degree of insolubility must be such that the solubility is less than 0.01 gram per 100 cc. of water. When the term "insoluble" is used hereinafter, it is understood that it is referred to in that sense.

Agents which precipitate insoluble calcium and aluminum salts are phosphoric acid and its salts, hydrofluoric acid and its salts, fluosilicic acid and its salts, and many organic acids and organic compounds such as oxalic acid, tartaric acid, citric acid in the presence of alcohol, certain urea derivatives, malic acid in the presence of alcohol, etc. The disadvantage of many of these agents is that, while they precipitate calcium in neutral solution, the lime salt tends to dissolve in slightly acid solution or slightly alkaline solution or is soluble in an excess of agent. This is particularly true of the phosphoric, hydrofluoric and fluosilicic acid materials. This is shown by the fact that while such dispersions work well when first made they tend to develop afterset on standing due to the re-dissolving of the calcium compound. With care, such agents can be used providing just sufficient agent is used to precipitate the lime and the mixture is maintained at a neutral point, that is, a pH of 6.5 to 7.5. In such event the dispersion does not develop afterset. However, due to the inevitable variation in lime content from batch to batch it is a tedious matter to properly adjust each batch to a suitable end point, and an agent in which the insoluble lime precipitate is undissolved by an excess is most satisfactory. It has therefore been found that by far the most satisfactory of such agents is oxalic acid, and to a lesser extent tartaric acid. Citric and malic acids are suitable only in the presence of alcohol, since calcium citrate and calcium malate are soluble in water (i. e., more than 0.01 gram per 100 cc. of water) but insoluble in a mixture of alcohol and water. Organic acids such as tannic acid and the nutgalls are not suitable since they tend to develop afterset and are inoperative on zircons from some sources.

In addition to the above mentioned agents, certain pyrophosphates of sodium formed as a melt at high temperatures, which have been made commercially available only recently, have been found to operate practically as well as oxalic acid. They vary in composition from $Na_4P_2O_7$ to $Na_6P_4O_{13}$. They differ from the usual sodium phosphates in that addition compounds are formed with lime and lime derivatives and that extremely small quantities are necessary. The addition compounds are completely insoluble. The action of these pyrophosphates is markedly different than that obtained by the usual phosphates used heretofore in ceramic industry. The names of these active phosphates are tetrasodium pyrophosphate and hexasodium metapyrophosphate. All compositions between these two will produce the desired results.

When the lime impurity is present in the form of a slightly soluble compound such as calcium carbonate or calcium silicate, the precipitation with oxalic acid takes place very slowly. There is also some tendency to form an injurious gel-like precipitate, which is possibly due to the formation of a coating of calcium oxalate over each particle of calcium carbonate or calcium silicate, through which the calcium ions seep very slowly, delaying or preventing proper deflocculation. By transforming such slightly soluble calcium compounds to a more soluble form the oxalic acid can precipitate the lime immediately and defloccuation is assured. This can be accomplished by treating the zircon in the milled slip form with hydrochloric acid until it reaches a pH of 6.5 to 7.5. The slightly soluble lime compounds are decomposed by this action, so that the oxalic acid is enabled to operate in the expected manner, precipitating the lime in an insoluble crystalline form.

Use of oxalic acid alone has some disadvantages from a commercial standpoint. The excess acid is of course water soluble and, as the ware is air dried after removal from the mold, the oxalic acid tends to migrate to the surface of the ware, forming an unsightly, powdery scurf which is easily dislodged. Furthermore, the ware has a low green strength and is easily damaged in handling. The addition of a small amount of gelatine or boric acid has been found to overcome both of these difficulties. Of the two, boric acid is preferred, since it not only increases green strength and prevents migration of oxalic acid to the surface, but also adds greatly to the strength of the ware in the firing operation. The boric acid is subsequently eliminated if the firing is carried to a sufficiently high temperature.

Since zircon ware for corrosion resistance must have a tight structure, substances which aid in development of vitrification on firing may also be added without affecting the qualities of the slip. Such substances are small amounts of aluminum silicates or magnesium silicates, such as clays, kaolins, mullites, sillimanites, bentonites, talc, etc. For example, with the addition of small amounts of such substances, semi-vitrification on firing is reached at 2800° to 3000° F., particularly in the presence of boric acid, while in the absence of such substances firing must be carried somewhat higher to reach the same surface hardness.

Oxalic acid and the specific sodium pyrophosphates are such powerful deflocculants for zircon slips in the practice of the present invention that it has been found that it is possible to obtain certain other slip characteristics which are of commercial importance. Among the most important of such characteristics is the securing of a long working range in the original mixing of the zircon and liquor. By long working range is meant the gradual reduction of viscosity with the continued addition of water, instead of a sharply defined transition point from solid to liquid when a certain amount of water has been added. In mixing viscous compositions, a considerable amount of work must be expended, and agents which increase the working range aid in cutting down the time and energy normally expended in securing such mixtures. Other agents can be added to yield a slip which can be used to form relatively massive structures as well as thin walled structures. Finally, agents can be added to yield a slip which will lose its water content either rapidly or slowly when poured into a plaster of Paris mold. There are still other desirable slip characteristics which will come to light in the discussion below. The flexibility of such modifications are possible only because of the powerful deflocculating effect of the deflocculating agents of the present invention on the zircon.

For example, we have found that the water insoluble compound known as calcium zirconium silicate, when added to zircon in small quantities in the presence of oxalic acid or the pyrophosphates, is very effective in producing very tight and dense structures in a plaster mold, the calcium zirconium silicate addition having little or no effect on the deflocculated characteristics. We have found that the addition of small quantities of alkali fluosilicates, calcium aluminosilicates, Portland cement, and similar materials is very effective in increasing working range, and decreasing the time and energy required for mixing in the presence of oxalic acid or the pyrophosphates without having any pronounced effect on the deflocculation characteristics.

Also we have found that, by varying these additions, the casting slip can be made to form a dried piece with a relatively large pipe in the center, and with other variations a dried piece of little or no pipe in the center is obtained. In making massive structures it is a distinct advantage to use a slip which forms little or no pipe since the mold must be kept continually filled as shrinkage and water sorption progresses. Obviously, the smaller the pipe the less time required for final filling. In general, the deeper the pipe the longer the time required for sorption of water by the porous mold and the shallower the pipe the shorter the time required for sorption of water by the porous mold. In general, oxalic acid decreases work necessary for mixing, increases piping, increases the density of the piece, and increases the time necessary for removal of the piece. The pyrophosphates decrease work necessary for mixing, decrease piping, have only slight effect on the finished density and decrease the time necessary for removal from the mold. The chief effect of calcium zirconium silicate is to increase the density of the finished piece. Sodium fluosilicate decreases the time and work necessary for mixing, strongly decreases piping, decreases the density of the piece, and decreases the time necessary for removal from the mold. Calcium aluminum silicate or Portland cement has an effect similar to certain combinations of calcium zirconium silicate and sodium fluosilicate.

Thus by using the above agents or certain combinations of the above agents practically any desired slip characteristic for any required set of properties may be obtained, such as fast working up time, casting of thick walled or thin walled pieces, quick removal or slow removal from the mold, dense or porous, massive or small structures, etc. Thus a slow sorption deep piping slip will be most suitable for casting thin walled structures which are very long in comparison with their cross section, while a rapid sorption shallow piping slip will be most suitable for casting massive structures such as bricks and blocks, etc.

As far as the quantity of these materials, including the deflocculating agents, is concerned, extremely small quantities are effective. In fact quantities above certain limits are undesirable. In the case of oxalic acid, quantities as low as 0.05% are extremely effective, while quantities above 5% are undesirable. In the case of the special pyrophosphates, between 0.03% and 0.2% is preferred. More than 0.1% sodium fluosilicate will result in a bad and undesirable afterset condition, excellent results being obtained with 0.05% and as little as 0.01% being effective. More than 0.2% Portland cement or calcium aluminum silicate results in afterset, 0.1% or less being satisfactory and as little as 0.03% being effective. While as little as 0.1% calcium zirconium silicate is effective, the amount of this reagent may be increased to 1.0% without deleterious effect, any further additions being unnecessary though not dangerous.

Occasionally it is necessary to prepare shapes which are not only hard but have a good resistance to heat shock. This is accomplished by adding granular zircon (e. g., 80 mesh) to the mix and handling as before, since the granular material also has no deleterious effect on the zircon.

Having described the invention, we now give the following examples:

Example 1

Granular zircon assaying at least 99% zircon content is milled with tap water to minus 325 mesh. The slip is discharged into a suitable receptacle and the pH adjusted to a permanent reading of 6.5 to 7.0 with dilute hydrochloric acid. The slip is then dried and the product disintegrated. 25 pounds of milled zircon thus prepared is thoroughly mixed with 1850 cc. of 5% oxalic acid solution. The mass is screened to break up lumps and cast in the usual manner in plaster molds. The pieces obtained are dried and fired to 1510° C.

Example 2

The same procedure is followed as in Example 1, except that 1700 cc. of 5% oxalic acid solution and 200 cc. of 4% boric acid solution are used in place of 1850 cc. of 5% oxalic acid solution. The pieces develop high green strength and avoid a powdery surface.

Example 3

25 pounds of milled zircon prepared as in Example 1 is thoroughly mixed with 1700 cc. of 5% oxalic acid solution, 200 cc. of 4% boric acid solution and 0.2 pound of clay (or kaolin, mullite, sillimanite or talc). The mass is screened and cast as in Example 1, and the pieces dried and fired at 1425° C. A semi-vitrified refractory is obtained.

In each case of the Examples Nos. 1, 2 and 3, the liquid content may be increased as high as a total of 2500 cc. per 25 pounds of zircon without causing forming cracks, particularly in making thin walled ware. For slop molding in plaster molds the liquid content is cut to about 1700 cc. per 25 pounds, the ratio of oxalic acid to boric acid remaining the same. For slop molding in wooden (non-porous) molds the liquid content is cut to about 1625 cc. per 25 pounds, the ratio of oxalic acid to boric acid remaining the same. In some cases the use of granular material may be desirable. With the above type formulae up to 30 parts of 80 mesh zircon per 100 parts of total zircon can easily be carried in proper suspension in the casting process.

Example 4

For thin walled structures of much greater length than cross section: 0.1% oxalic acid, balance pure zircon of 99 to 100% tenor milled to minus 325 mesh. Use 16 to 17 cc. of water per 100 grams of mix.

Example 5

For thick walled structures of approximately equal length and cross section: 0.1% of tetrasodium pyrophosphate or hexasodium metapyrophosphate or mixtures of the two, balance pure zircon of 99 to 100% tenor milled to minus 325 mesh. Use 16 to 17 cc. of water per 100 grams of mix.

Example 6

For heavy massive structures and quick mold removal: 0.1% oxalic acid, 0.03% sodium fluosilicate, 0.8% calcium zirconium silicate, balance pure zircon of 99 to 100% tenor milled to minus 325 mesh. Use 16 to 17 cc. of water per 100 grams of mix.

Example 7

For heavy massive structures and quick mold removal: 0.1% of the phosphates in Example 5, 0.05% of Portland cement or calcium aluminum silicate, balance pure zircon of 99 to 100% tenor milled to minus 325 mesh. Use 16 to 17 cc. of water per 100 grams of mix.

Example 8

For heavy massive structures of intricate design: 0.1% of the phosphates in Example 5, 0.01% sodium fluosilicate and 0.8% calcium zirconium silicate, balance pure zircon of 99 to 100% tenor milled to minus 325 mesh. Use 16 to 17 cc. of water per 100 grams of mix.

Example 9

For thick walled hollow structures: 0.1% oxalic acid, 0.01% sodium fluosilicate, and 0.05% Portland cement or calcium aluminum silicate, balance pure zircon of 99 to 100% tenor milled to minus 325 mesh. Use 16 to 17 cc. of water per 100 grams of mix.

Example 10

For high density structures: 0.8% calcium zirconium silicate, 0.1% oxalic or 0.1% of the phosphates in Example 5, balance pure zircon of 99 to 100% tenor milled to minus 325 mesh. Use 16 to 17 cc. of water per 100 grams of mix.

In Examples 4–10, the mixtures are cast, removed from the mold, dried and fired to at least 1500° C. and preferably to 1600° C.

By practicing the present invention, easily workable slips can be obtained with relatively small quantities of water. In cases where ordinary tap water is used, without use of a precipitating agent, 18 to 20 cc. of water per 100 grams of zircon are not sufficient to attain the required workability. Where distilled water is used, 16 cc. is sufficient to produce a properly deflocculated slip. Where any of the precipitating agents described above are used, 14 to 15 cc. of tap water will produce a properly deflocculated slip. If as much as several per cent of soluble calcium compounds are present, on the other hand, 30 cc. of water per 100 grams of zircon will not produce the required workability. As any quantities of water above 17 cc. per 100 grams of zircon will cause cracking or other undesirable results, it will be seen that only by substantially eliminating calcium compounds in accordance with the present invention will a slip of proper characteristics be produced.

As many variations are possible within the scope of this invention, it is not intended to be limited except as defined by the appended claims.

We claim:

1. A fluid moldable composition suitable for forming refractory articles, comprising a major proportion of zircon and water in an amount not substantially more than 17 cc. per 100 grams of zircon, said composition containing less than 0.01 gram per 100 cc. of water of dissolved calcium and aluminum salts.

2. A fluid moldable composition suitable for forming refractory articles, comprising a major proportion of zircon, water in an amount not substantially more than 17 cc. per 100 grams of zircon, and a minor proportion of an agent capable of converting calcium and aluminum salts to insoluble crystalline precipitates having a water solubility less than 0.01 gram per 100 cc. of water.

3. A fluid moldable composition suitable for forming refractory articles, comprising a major proportion of zircon, water in an amount not substantially more than 17 cc. per 100 grams of zircon, and a minor proportion of oxalic acid.

4. A fluid moldable composition suitable for forming refractory articles, comprising a major proportion of zircon, water in an amount not substantially more than 17 cc. per 100 grams of zircon, and a small but effective quantity up to 5% oxalic acid.

5. A fluid moldable composition suitable for forming refractory articles, comprising a major proportion of zircon, water in an amount not substantially more than 17 cc. per 100 grams of zircon, a minor proportion of oxalic acid, and a minor proportion of boric acid.

6. A fluid moldable composition suitable for forming refractory articles, comprising a major proportion of zircon, water in an amount not substantially more than 17 cc. per 100 grams of zircon, and a small but effective quantity up to 0.2% of a sodium pyrophosphate having an empirical composition between $Na_4P_2O_7$ and $Na_6P_4O_{13}$.

7. A fluid moldable composition suitable for forming refractory articles, comprising a major proportion of zircon, water in an amount not substantially more than 17 cc. per 100 grams of zircon, a minor proportion of oxalic acid, and a minor proportion of sodium fluosilicate.

8. A fluid moldable composition suitable for forming refractory articles, comprising a major proportion of zircon, water in an amount not substantially more than 17 cc. per 100 grams of zircon, a small but effective quantity up to 0.2% of a sodium pyrophosphate having an empirical composition between $Na_4P_2O_7$ and $Na_6P_4O_{13}$, and sodium fluosilicate.

9. The method of preparing fluid moldable compositions suitable for forming refractory articles comprising forming a mixture containing a major proportion of zircon and water in an amount not substantially more than 17 cc. per 100 grams of zircon, and converting water soluble calcium and aluminum salts in said mixture into the form of insoluble crystalline precipitates having a water solubility less than 0.01 gram per 100 cc. of water.

10. The method of preparing fluid moldable compositions suitable for forming refractory articles comprising milling zircon with water, neutralizing, drying, mixing with water in an amount not substantially more than 17 cc. per 100 grams of zircon, and converting water soluble calcium and aluminum salts in said mixture into the form of insoluble crystalline precipitates having a water solubility less than 0.01 gram per 100 cc. of water.

11. The method of preparing fluid moldable compositions suitable for forming refractory articles comprising forming a mixture containing a major proportion of zircon, water and a minor proportion of oxalic acid, the amount of said water not substantially exceeding 17 cc. per 100 grams of zircon.

12. The method of preparing fluid moldable compositions suitable for forming refractory articles comprising forming a mixture containing a major proportion of zircon, water, and a small but effective quantity up to 0.2% of a sodium pyrophosphate having an empirical composition between $Na_4P_2O_7$ and $Na_6P_4O_{13}$, the amount of said water not substantially exceeding 17 cc. per 100 grams of zircon.

13. The method of preparing fluid moldable compositions suitable for forming refractory articles comprising milling zircon with water, neutralizing, drying, and mixing with water and a minor proportion of oxalic acid, the amount of said water not substantially exceeding 17 cc. per 100 grams of zircon.

14. The method of preparing fluid moldable compositions suitable for forming refractory articles comprising milling zircon with water, neutralizing, drying, and mixing with water and a small but effective quantity up to 0.2% of a sodium pyrophosphate having an empirical composition between $Na_4P_2O_7$ and $Na_6P_4O_{13}$, the amount of said water not substantially exceeding 17 cc. per 100 grams of zircon.

15. A composition suitable for forming refractory masses by slip-casting procedures, comprising a major proportion of zircon and a minor proportion of a material containing the oxalate radical.

16. A composition suitable for forming refractory masses by slip-casting procedures, comprising a major proportion of zircon and a small but effective quantity up to 5% of a material containing the oxalate radical.

17. A composition suitable for forming refractory masses by slip-casting procedures, comprising a major proportion of zircon and a small but effective quantity up to 5% of oxalic acid.

18. A composition suitable for forming refractories by slip-casting procedures, comprising a major proportion of zircon and a small but effective quantity up to 0.2% of a sodium pyrophosphate having an empirical composition between $Na_4P_2O_7$ and $Na_6P_4O_{13}$.

CHARLES J. KINZIE.
EUGENE WAINER.